US005489137A

United States Patent [19]

Herrmeyer

[11] Patent Number: 5,489,137
[45] Date of Patent: Feb. 6, 1996

[54] TRAILER WITH SLOPED ARTICLE HOLDING SPACES

[75] Inventor: Dennis C. Herrmeyer, Goshen, Ind.

[73] Assignee: Rigid Form, Inc., Paola, Kans.

[21] Appl. No.: 316,928

[22] Filed: Oct. 3, 1994

Related U.S. Application Data

[63] Continuation of Ser. No. 82,023, Jun. 23, 1993, which is a continuation-in-part of Ser. No. 11,895, Feb. 1, 1993, Pat. No. 5,273,337.

[51] Int. Cl.$^6$ ................................................. B62D 33/04
[52] U.S. Cl. ............................ 296/181; 296/24.1; 296/3
[58] Field of Search ............................... 296/3, 4, 24.1, 296/181, 183; 410/24, 24.1, 26, 28.1, 29, 43, 31, 32, 33, 44

[56] References Cited

U.S. PATENT DOCUMENTS

| | | |
|---|---|---|
| 1,438,813 | 12/1922 | Day. |
| 2,061,673 | 11/1936 | Robinson. |
| 2,371,055 | 3/1945 | Le Tourneau. |
| 2,710,221 | 6/1955 | Hinners. |
| 2,724,611 | 11/1955 | Robertson. |
| 2,839,328 | 6/1958 | Prickett et al.. |
| 3,501,195 | 3/1970 | Kramer, III .............................. 296/3 |
| 5,273,337 | 12/1993 | Herrmeyer ........................... 296/181 |

Primary Examiner—Joseph D. Pape
Attorney, Agent, or Firm—Litman, McMahon and Brown

[57] ABSTRACT

A trailer for transporting articles which, if laid flat, would cause the trailer to exceed the maximum highway width requirements imposed by state and federal highway regulations. The trailer includes a frame structure with a number of article spaces which slope continuously upward from a first, loading side to the opposite side of the trailer. Each article space is formed by a pair of rail subassemblies, each including a sloping transverse rail member with a first, lower end located in proximity to the trailer loading side and a second, upper end located in proximity to the trailer opposite side. Articles for which the trailer is designed include pick-up covers, which, if laid flat with their longitudinal axis perpendicular to that of the trailer, would exceed the highway maximums. With the pick-up covers loaded into the continuously sloped spaces, the trailer meets the highway standards.

17 Claims, 5 Drawing Sheets

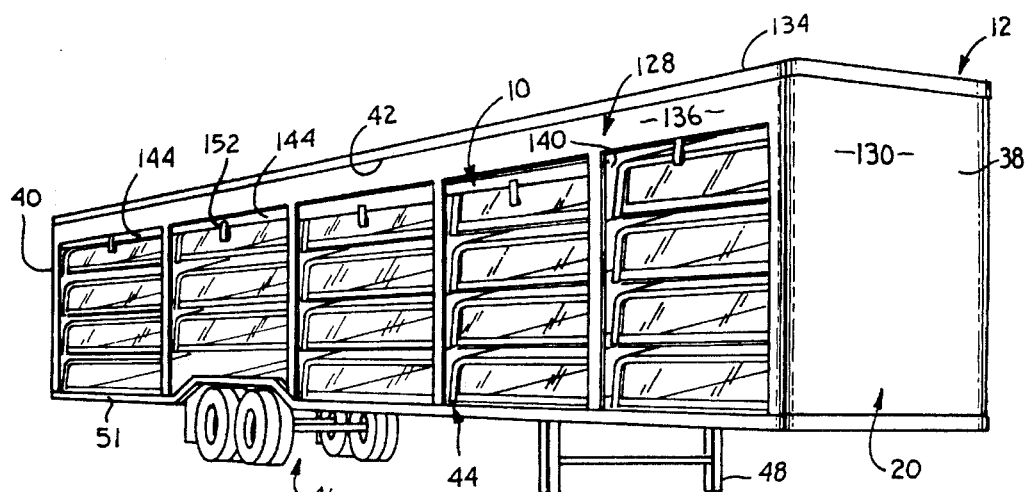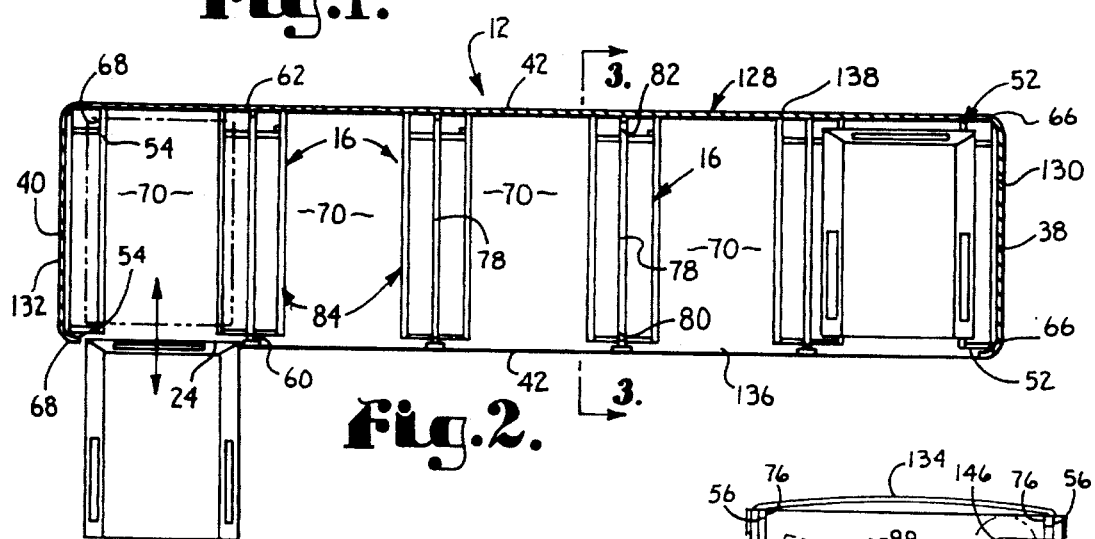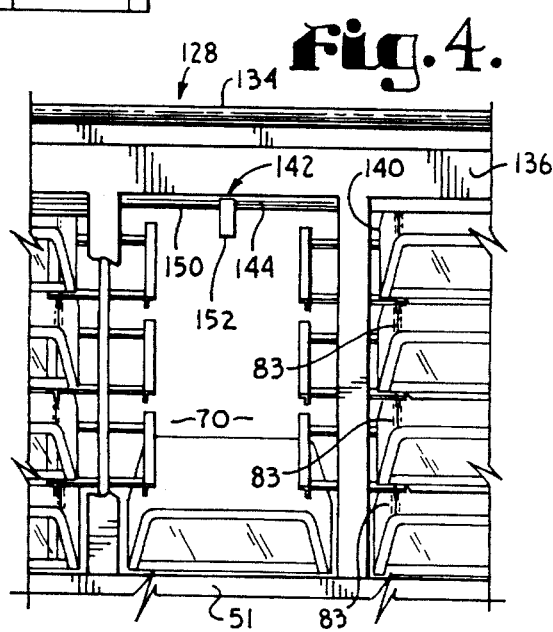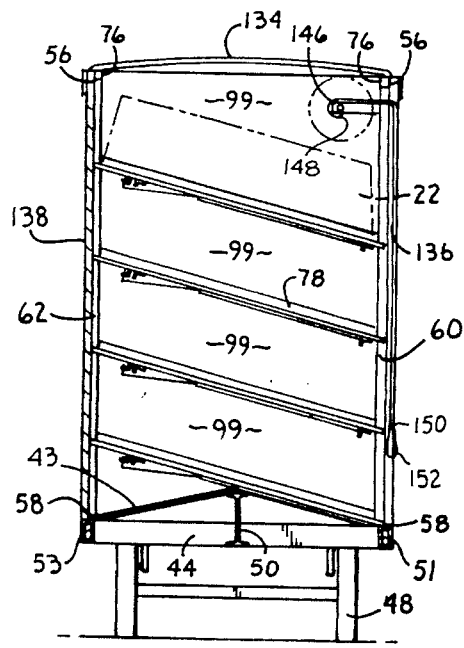

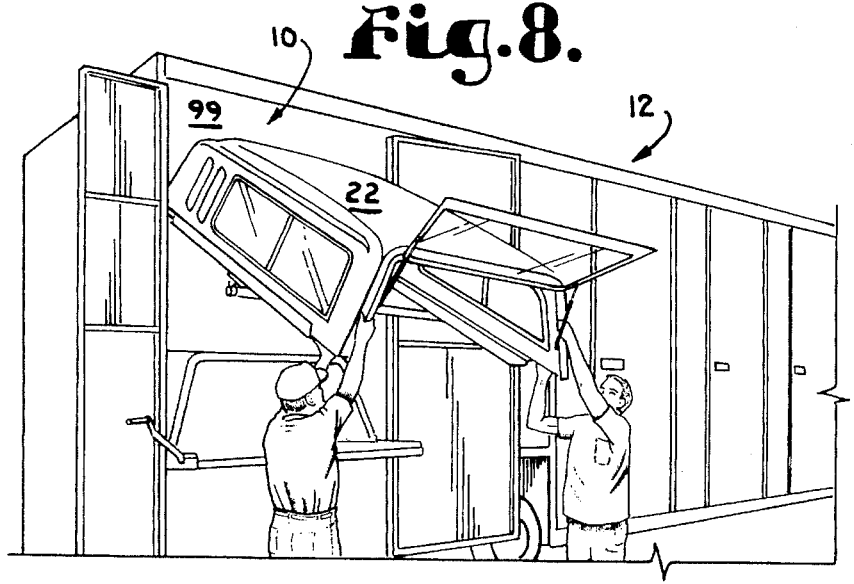
Fig.8.
Fig.9.
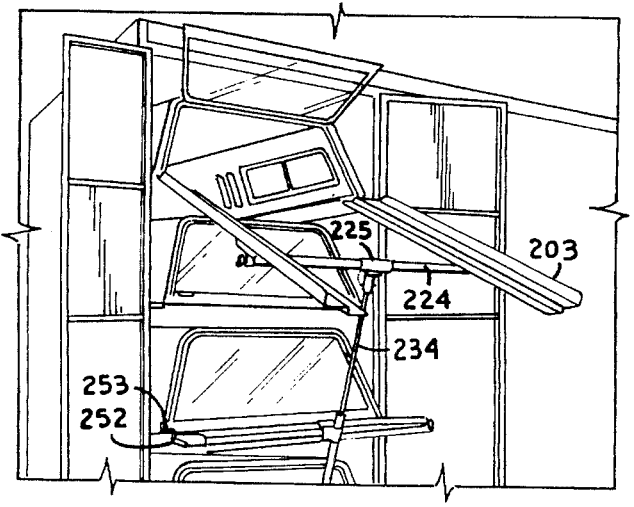
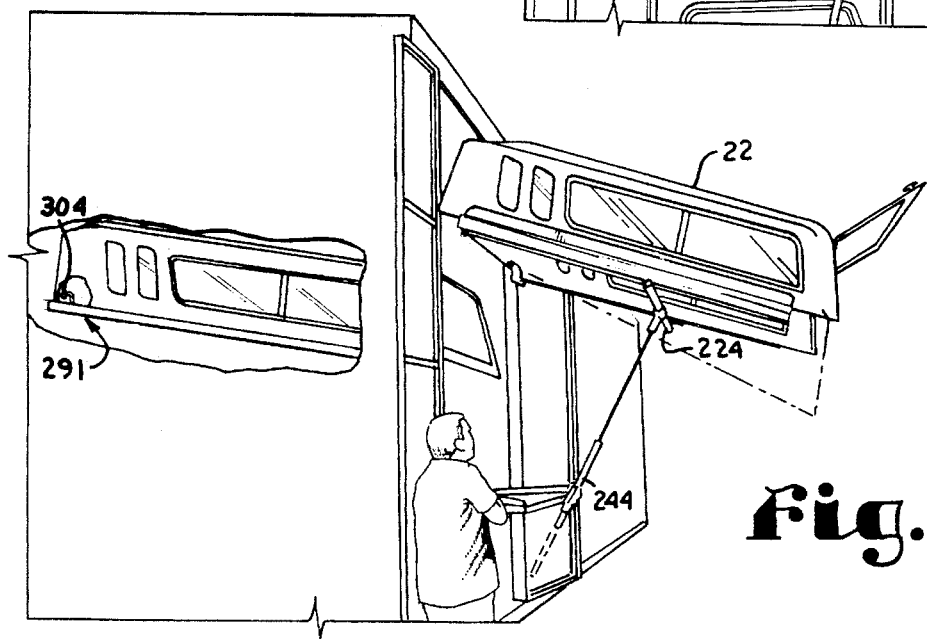
Fig.10.

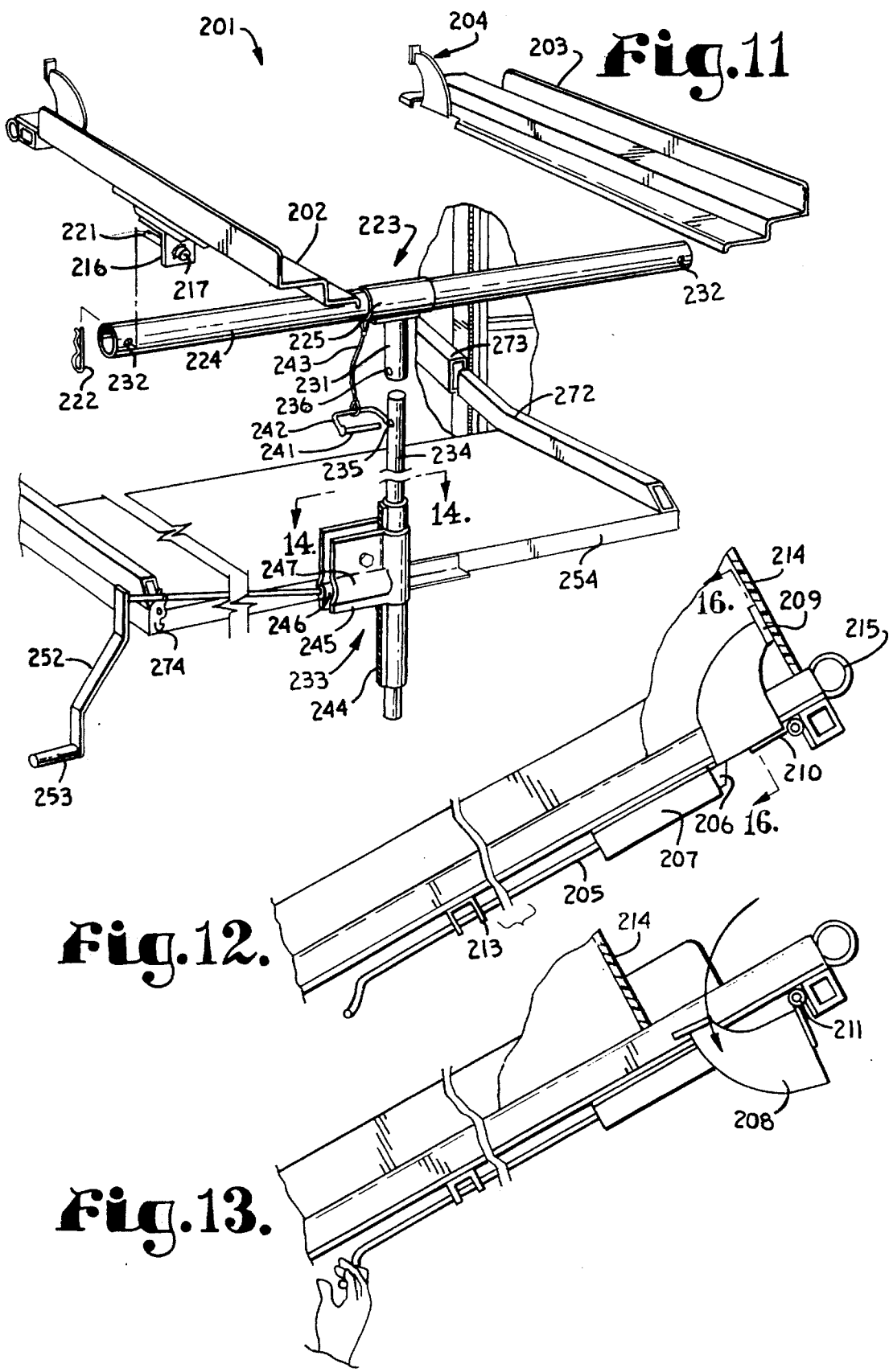

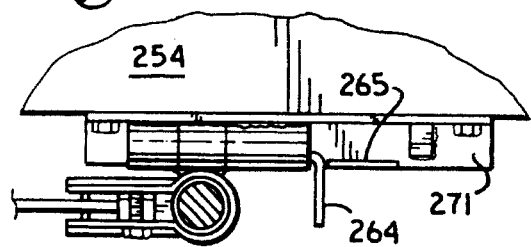
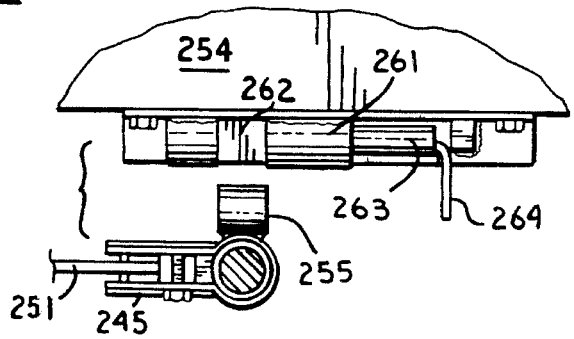
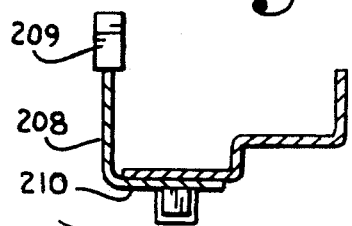
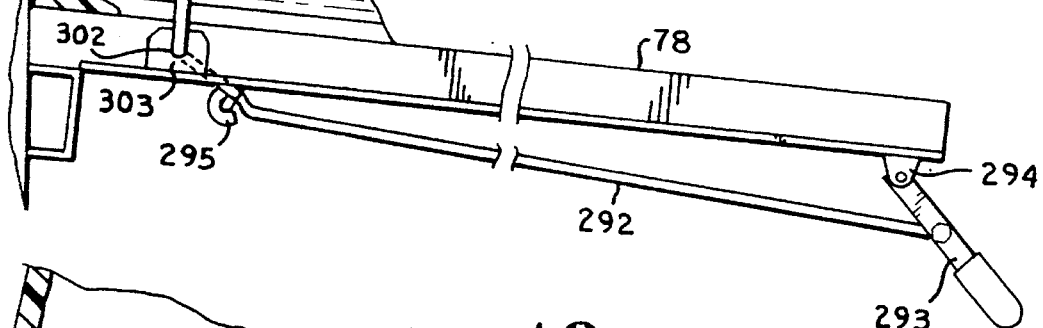
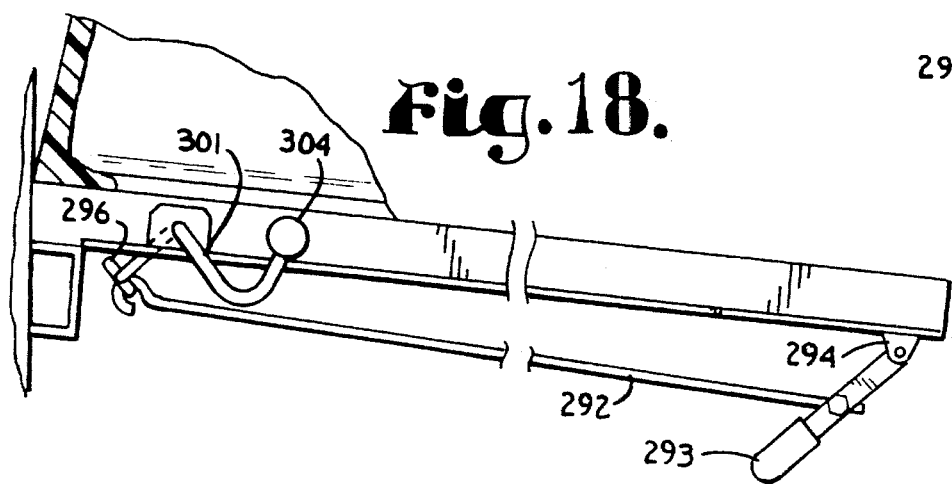

TRAILER WITH SLOPED ARTICLE HOLDING SPACES

CROSS REFERENCE TO RELATED APPLICATIONS

This application is a continuation of patent application Ser. No. 08/082,023, filed Jun. 23, 1993 and entitled ARTICLE UNLOADING SYSTEM AND METHOD, which is a continuation-in-part of patent application Ser. No. 08/011,895 filed Feb. 1, 1993, entitled ARTICLE RACK, now U.S. Pat. No. 5,273,337, issued Dec. 28, 1993.

BACKGROUND OF THE INVENTION

1. Field of the Invention

The present invention relates generally to a trailer with a plurality of article holding spaces, with each space sloping upward from a first, loading side of the trailer to the opposite side. The trailer is designed to haul articles, such as pick-up. truck cover shells, which, if laid flat across a conventional trailer, would cause the trailer to exceed the maximum width allowed for highway vehicles.

2. Description of the Related Art

Trailers are used to haul a wide variety of goods, and are often designed to accommodate particular types of articles in particular environments. The physical characteristics, i.e., size, shape, weight, etc., of the articles to be transported are often factors in designing a suitable trailer. Other factors can include loading and unloading considerations, protection from the elements and space limitations.

Examples of prior art vehicles and trailers which are specially designed to accommodate particular goods abound. For example, U.S. Pat. No. 1,438,813 to Day and U.S. Pat. No. 2,839,328 to Prickett et al. disclose truck bodies with shelves for receiving cases of bottled goods. The shelves slope inwardly and downwardly from the sides of the trucks to aid in retaining the cases of goods in place against centrifugal forces which may be encountered when the vehicles turn and maneuver. A trailer vehicle with a similar construction is shown in U.S. Pat. No. 2,061,673 to Robinson.

Pickup truck covers are a popular accessory or option for enclosing the beds of pickup trucks on which they are mounted. By thus enclosing the bed with a pickup truck cover, security and protection are provided for tools, materials and various other objects placed in the enclosed pickup truck bed. Pickup truck beds enclosed by covers can also be used as sheltered sleeping quarters.

Pickup truck covers can be fabricated from various materials, including fiberglass, fiber reinforced plastic (FRP), and sheet metal. Pickup truck covers are generally manufactured at manufacturing facilities and then transported to dealers for retail sale. In order to maximize the number of truck covers which can be hauled by a single trailer, pickup truck cover transport vehicles are often utilized which include racks for receiving the pickup truck covers in an orientation which is transverse to the direction of vehicle travel. The covers are generally loaded and unloaded from the vehicle sides, and the racks can be divided into multiple, transversely-extending bays, which each bay being adapted to receive multiple covers in vertically-stacked, cover-receiving spaces. To further increase the number of covers that can be transported in a load, smaller covers can be nested within larger ones.

Most previous cover transports were designed for the covers to lay flat and to extend transversely from side-to-side. However, relatively long covers oriented in this manner can exceed the load width restrictions applicable on many public roads and highways. Operators of vehicles with over-width loads can be subject to citations and substantial fines or impoundment by law enforcement officials.

Furthermore, difficulties have been encountered in providing an enclosure for a cover transport, because the enclosure structure further increases the cover transport width, which can result in a vehicle which is illegal to operate on many public roads and highways. However, there are important advantages to enclosing a cover transport. For example, covers transported in enclosed vehicles can be kept cleaner, thus avoiding a substantial amount of dealer preparation. A transport enclosure can also protect the covers therein from damage from hail, rocks and other falling and flying objects. Degradation of the finish on the covers can also be avoided by shading the covers from direct sunlight. A measure of security and theft protection can be provided by enclosing the cover transports.

An additional problem which occurs in the transportation of pickup truck covers is the loading, and, in particular, the unloading of such covers from the topmost positions in the cover transports. Presently, in order to off-load the covers occupying the topmost spaces in a transport rack, either the receiving dealer must use a forklift truck or provide three or more men who climb up the trailer and manhandle the cover off of the rack. Forklifts are expensive to purchase and maintain and thus represent a luxury which most small dealers cannot afford. However, when the pickup truck covers are physically manhandled, it is common for them to be accidentally dropped off of the transport or banged into other covers with consequent damage or destruction to the affected covers. The problem is magnified in instances where the covers are transported in closed trailers since access to the enclosed covers is limited. Individual pickup truck covers can cost as much as $2000 and it is estimated that the mishandling of pickup truck covers, particularly during unloading, costs the industry millions of dollars per year.

The trailer of the present invention addresses these problems with previous cover transports and similar problems that may exist with other trailers. The unloading system of the present invention allows pickup truck covers to be conveniently and safely unloaded by two men from even the topmost rack positions.

SUMMARY OF THE INVENTION

In the practice of the present invention, a trailer including a rack for accommodating pick-up covers or similar oversized articles is provided. The rack includes a frame structure forming multiple bays which extend transversely between opposite sides. Each bay includes multiple, vertically-stacked article-receiving spaces, each space being accessible through an opening at one side of the trailer. A rail assembly includes multiple rail subassemblies, pairs of which are associated with the article-receiving spaces and are adapted for supporting articles therein. The rail assemblies slope upwardly from the frame side openings associated therewith to the opposite side of the frame whereby articles are supported thereon in sloping configurations. A retainer assembly is also associated with each article-receiving space and is mounted on a rail subassembly therein, the retainer assemblies being adapted for retaining an article in the article-receiving space. A frame enclosure is provided for mounting on the frame structure and enclosing the trailer, and includes retractable closures for selectively covering the frame structure side openings. The vehicle chassis can be retrofitted with a longitudinal center beam for reinforcement.

An article unloading system associated with the trailer includes a pair of ramp members which are removably and pivotably connectable below the topmost receiving space position on the trailer with a rigid cross member connected between the two ramp members. A work platform is removably connectable adjacent one of the lower receiving spaces and a jack is positionable between the work platform and the ramp member rigid cross member. A remotely releasable article holding arm is positioned atop each of the ramp members to hold the article in place and, once released, to allow the article to slide down the ramp members to a stop. The jack can then be lowered and the article, e.g. a pickup truck cover, easily off-loaded by two workmen.

OBJECTS AND ADVANTAGES OF THE PRESENT INVENTION

The objects and advantages of the present invention include: providing a trailer; providing a trailer adapted for transporting articles in transversely-sloping positions; providing a trailer which has a width less than the lengths of articles placed therein due to the sloping positions of the articles; providing a trailer which enables relatively long articles placed transversely thereon in sloping positions to be transported legally over certain roads and highways; providing a trailer which is particularly well adapted for transporting pick-up covers; providing a trailer which is relatively easy to load and unload; providing a trailer which is adapted to be enclosed; providing a trailer which provides a relatively high degree of protection for articles placed thereon; providing an article unloading apparatus and method which permits two workmen to easily and safely unload an article from the topmost space in the trailer; to provide such an unloading system which is easily and quickly attachable and removable for convenient storage; to provide such an unloading system which allows bulky articles, such as pickup truck covers, to be safely removed from the topmost rack position with minimal risk of damage to the article or injury to the workmen; and providing a trailer and an unloading system which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a right front perspective view of an enclosed trailer embodying the present invention.

FIG. 2 is a top plan view of the interior article framework support system of the trailer of FIG. 1.

FIG. 3 is an enlarged, vertical, cross-sectional view of the trailer, taken generally along line 3—3 in FIG. 2.

FIG. 4 is an enlarged, fragmentary, right-side elevational view of the trailer.

FIG. 8 is a perspective view of the unloading system positioned on the trailer and with a pickup truck cover being off-loaded by two workmen.

FIG. 9 is a perspective view of the unloading system positioned on the trailer and with a pair of unloading ramps arranged in a lowered position.

FIG. 10 is a perspective view of the unloading system positioned on the trailer and with a pickup truck cover positioned on the pair of unloading ramps and with a workman lowering the unloading ramps from a raised position (solid lines) to a lowered, off-loading position through an arc (phantom lines).

FIG. 11 is an enlarged, exploded view of the unloading system illustrating the parts thereof and their interconnection.

FIG. 12 is an enlarged, fragmentary side elevational view of one of the unloading ramps, with a pickup cover support arm placed in a cover supporting position.

FIG. 13 is an enlarged, fragmentary side elevational view of one of the unloading ramps, with the cover support arm placed in a cover releasing position.

FIG. 14 is an enlarged, fragmentary cross-sectional view of the connection of a jack-stand to a workman's support platform, taken along line 14—14 of FIG. 11.

FIG. 15 is aft enlarged, fragmentary cross-sectional view of the removal of the jack stand from the workman's support platform.

FIG. 16 is an enlarged, fragmentary cross-sectional view of the pickup truck cover support arm, taken along line 16—16 of FIG. 12.

FIG. 17 is an enlarged, fragmentary side elevational view of a remotely controllable article latching mechanism within the trailer, and with the latching mechanism in an article engaging position.

FIG. 18 is an enlarged, fragmentary side elevational view of a remotely controllable article latching mechanism within the trailer, and with the latching mechanism in a disengaged position.

DETAILED DESCRIPTION OF THE PREFERRED EMBODIMENTS

I. Introduction and Environment

Figure 5:
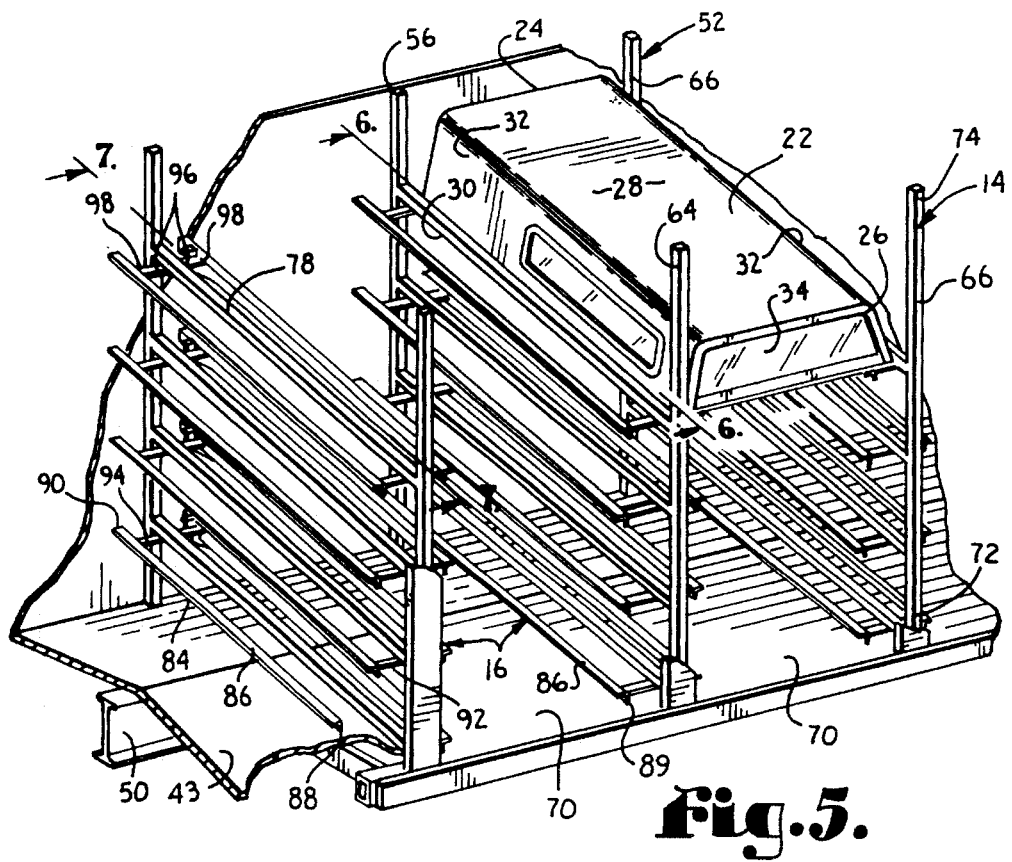
FIG. 5 is an enlarged, fragmentary, top rear right-side perspective view of the trailer, illustrating the placement of a pick-up cover in one article receiving space.

As required, detailed embodiments of the present invention are disclosed herein; however, it is to be understood that the disclosed embodiments are merely exemplary of the invention, which may be embodied in various forms. Therefore, specific structural and functions details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "up", "down", "right" and "left" will refer to directions in the drawings to which reference is made. The words "inward" and "outward" will refer to directions toward and away from, respectively, the geometric center of the structure being referred to. Said terminology will include the words specifically mentioned, derivatives thereof and words of similar import.

Referring to the drawings in more detail, reference numeral 10 generally designates an article supporting portion of a trailer 12 embodying the present invention. The trailer 12 generally includes a frame structure 14, a rail system 16, a retainer system 18 and an enclosure system 20.

Figure 6:
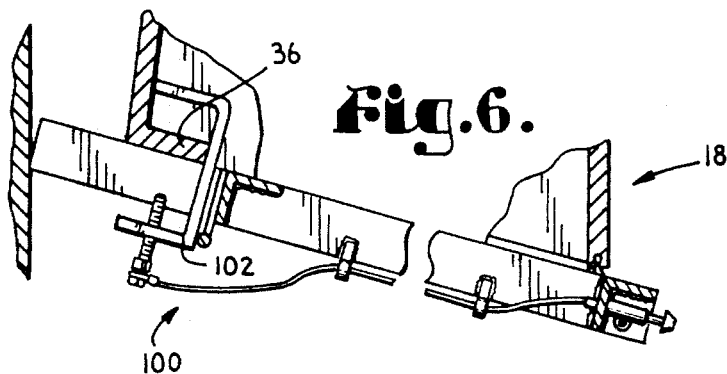
FIG. 6 is an enlarged, fragmentary, cross-sectional view of the trailer and trailer, taken generally along line 6—6 of FIG. 5 and particularly showing a retainer mechanism in its locked position.
Figure 7:
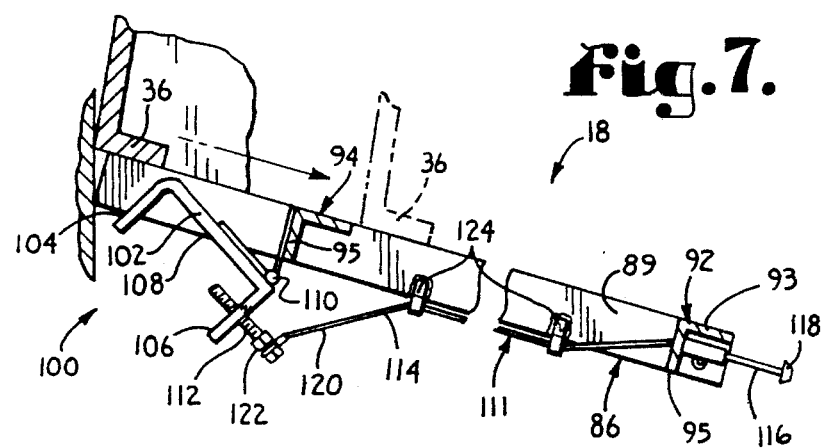
FIG. 7 is an enlarged, fragmentary, vertical, cross-section view of the trailer and trailer, similar to FIG. 6 and particularly showing the retainer mechanism in its release position.

Without limitation on the generality of useful applications for trailers embodying the present invention, the trailer 10 is shown and described as being designed to receive, support and transport pickup trucks covers 22 each including a front end 24, a back end 26, a top 28, a bottom 30 and opposite sides 32. The cover back ends 26 slope downward and rearward, and include doors 34. The cover front ends 24 include rearward-extending lower edge flanges 36 (FIGS. 6 and 7).

II. Trailer 12

As best shown in FIGS. 1–3, the trailer 12 includes a front end 38, a back end 40 and opposite sides 42. A chassis 44 mounts a wheel assembly 46 and a support leg assembly 48. The chassis 44 can include a center beam 50 and first and second rim members or beams 51, 53 extending longitudinally between the trailer front and back ends 38, 40. The center beam 50 can have the configuration of an I-beam (as shown in FIG. 3) or a box beam (not shown) and can be approximately centered between and parallel to the trailer opposite sides 42.

III. Frame Structure 14

The frame structure 14 includes a front end 52, a back end 54, a top 56, a bottom 58 and first and second sides 60, 62. A plurality of vertical columns 64 are arranged in transversely-opposed pairs with each column pair having a column located on each frame structure side 60, 62. A frontmost column pair 66 is positioned at the frame structure front end 52 and a rearmost column pair 68 is positioned at the frame structure back end 54. A plurality (e.g. five are shown) of frame structure bays 70 are formed between the pairs of columns 64, each bay 70 extending transversely between the frame structure opposite sides 60, 62. The columns 64 each include lower ends 72 connected to the trailer chassis 44 and upper ends 74 interconnected by longitudinally-extending longitudinal members 76.

The opposed pairs of columns 64 are interconnected by transverse cross members 78 which extend transversely between the frame structure sides 60, 62 and slope downwardly from the second side 62 to the first side 60 at angles of approximately fifteen degrees with respect to horizontal. Each cross member 78 includes a first end 80 connected to a column 64 at the first side 60 and a higher second end 82 connected to a column 64 at the second side 62.

The frame structure 14 can comprise square steel tubing, angle sections, I-beams or any other suitable structural members. Gusset plates, bracing and the like can be provided to stiffen the frame structure 14.

IV. Rail System 16

The rail system 16 includes a plurality of rail subassemblies 84 arranged in longitudinally opposed pairs on the fronts and backs of respective bays 70. Each rail subassembly includes a transverse angle section member 86 with first or lower and second or upper ends 88, 90 located in proximity to the frame structure first and second sides 60, 62. First or lower and second or upper rail mounting members 92, 94 extend longitudinally into the bays 70 from proximate ends 96 connected to respective cross members 78 to distal ends 98 connected to respective rail angle section members 86. The rail mounting members 92, 94 associated with the frontmost and rearmost column pairs 66, 68 extend rearward and forwardly only; all of the other rail mounting members 92, 94 are provided in pairs extending both forwardly and rearward from respective cross members 78. The paired mounting members 92, 94 can be formed from continuous lengths of material whereby their respective proximate ends 96 are centered on the cross members 78. Thus, except for the cross members 78 extending between the frontmost and rearmost column pairs 66, 68, rail subassemblies 84 are located both in front of and behind respective cross members 78.

The rail members 86 are substantially parallel to the cross members 78, with the cross members 78 generally centered between and extending parallel to respective pairs of rail members 86. The rail angle-section members 86 can comprise steel angle-section with horizontal legs 96 located on top of and projecting into respective bays 70 from vertical legs 89. Each rail mounting member 92, 94 can also comprise steel angle-section, with upper horizontal legs 93 mounted (e.g. welded) on the undersides of respective cross members 78 and vertical legs 95 depending downwardly from the horizontal legs 93. The mounting member distal ends 98 are secured to respective rail members 86, e.g. by welding.

Each bay 70 is subdivided into a plurality of article-receiving spaces 99 (e.g., see FIG. 3, four spaces 99 are shown in each bay 70) by respective, opposed pairs of rail subassemblies 84. Each article-receiving space 99 is thus positioned above a respective opposed pair of rail subassemblies 84 and extends transversely with an upward slope from the frame structure first side 60 to the frame structure second side 62. The frame structure 14 includes a plurality of openings 83 at its first side 60, each opening 83 being associated with a respective bay 70.

V. Retainer System 18

A retainer system 18 for the covers 22 is shown in detail in FIGS. 6 and 7 and can comprise a plurality of retainer mechanisms 100 each associated with a respective article-receiving space 99.

Each retainer mechanism 100 includes a retainer bracket 102 with a channel-shaped cross-sectional configuration including upper and lower flanges 104, 106 interconnected by a web 108. Each bracket 102 is pivotally connected to a respective second or upper rail mounting member 94 by a hinge 110 connected to a respective rail mounting member vertical leg 95 and the retainer bracket web 108. A bolt 112 is threadably received in the lower flange 106 and depends downwardly therefrom. A retainer actuating subassembly 111 is associated with each retainer mechanism 100 and includes a release cable 114 with a first cable end 116 extending through a respective first rail mounting member 92 and connected to a retainer release handle 118 and a second cable end 120 secured by a nut 122 to the bolt 112 at the head end of the bolt 112 below the bracket lower flange 106. The cable 114 slidably passes through cable guides 124 on the vertical leg 89 of the rail member 86.

VI. Enclosure System 20

The enclosure system 20 includes a frame structure enclosure 128 with front, back, top, first side and second side panels 130, 132, 134, 136 and 138 respectively. The enclosure front panel 130 can be forwardly-convex, forwardlyconverging, forwardly-tapered or otherwise aerodynamically shaped to reduce wind resistance of the trailer 10 in motion. The first side panel 136 includes a plurality (five are shown) of enclosure panel openings 140 which generally align with and correspond to the frame structure openings 83.

Each frame structure opening 83 and enclosure panel opening 140 can be selectively closed by a respective overhead door assembly 142. Each overhead door assembly 142 includes a flexible (e.g. fabric or slatted) door 144 adapted to selectively cover respective openings 83, 140 in a closed position and adapted to be wound on a take-up reel mechanism 146 in a retracted position. Each door 144 includes a proximate end 148 attached to the take-up reel mechanism 146 and a distal end 150 with a handle 152; the distal end 150 can be attached and locked to the vehicle chassis 44 with the door 144 in its closed position.

VII. Unloading System

Referring to FIGS. 8–16, and particularly to FIG. 11, an unloading system 201 includes a pair of unloading ramps 202 and 203. Each of the ramps 202 and 203 includes a pivotable article holding arm 204 which is remotely controllable via an elongate rod 205. The rods 205 are connected to a spring loaded latching member 206 which is adapted to move within a rectangular sleeve 207. Referring to FIGS. 12, 13 and 16, the holding arm 204 includes a curved plate 208 to which is attached a resilient pad 209. The plate 208 is attached to a pivot plate 210 which is pivotably attached to the ramp 202 via a pivot mount 211. A counterweight arm 212 extends opposite of the plate 208. A rod support bracket 213 is attached to the underneath side of the ramps 202, 203 to support the rod 205. FIG. 12 shows the arm 204 pivoted upward into contact with a rear wall 214 of a pickup truck cover 22. At FIG. 13, when a workman pulls the rod 205, the latching member 206 is pulled backward against the action of a spring (not shown) in the sleeve 207, thus allowing the arm 204 to drop out of contact with the rear wall 214 of the cover 22, and allowing the cover 22 to be slid off of the ramps 202 and 203.

Each of the ramps 202 and 203 also include an attachment sleeve 215 which is adapted to mate with a corresponding bolt (not shown) on each side of and below the topmost article space 99 on the trailer 10. Each of the ramps 202 and 203 includes an L shaped bracket 216 attached to the lower side thereof, with a pin 217 attached thereto. The pins 217 each include a bore 221 for receiving a cotter pin 222. A cross-member 223 comprises a cylindrical pipe 224 attached to a horizontally oriented sleeve 225. The sleeve 225 is attached to a vertically oriented sleeve 231 to form a T shape. The pipe 224 includes a pair of bores 232 oriented to receive the pins 217 of the ramps 202 and 203.

A screw jack assembly 233 includes a rod 234 which is sized to fit within the sleeve 231. The rod 234 includes a bore 235 which is aligned with a similar bore 236 in the sleeve 231. A pin 241 is attached to a U shaped retaining member 242, which is, in turn, attached to the pipe 224 via a tether 243. The pin 241 is insertable through the bores 235 and 236 to retain the rod 234 in place on the sleeve 231. The jack assembly 233 includes a conventional ratcheted member 244 attached to the rod 234, a two-sided plate 245 and an elevating screw 246 inserted through a channel 247 in the plate 245. An elongate rod 251 is pivotably attached to the screw 246 and a crank 252 and a handle 253 are attached to the rod 251. Referring to FIGS. 14 and 15, the jack assembly 233 is removably and pivotably attachable to a workman's platform 254 via a sleeve 255 attached to the jack plate 245. A sleeve 261 attached to the platform 254 includes a bay 262 sized to receive the sleeve 255. A slidable pin 263 with a handle 264 can be selectively slid into position within the sleeves 255 and 261 to secure the jack assembly 233 to the platform 254. Once in the securing position illustrated in FIG. 14, the handle 264 can be rotated inside of a locking member 265 to hold the pin 263 in place. The locking member 265 is attached to an angle section 271 which is bolted to the platform 254.

Referring again to FIG. 11, the platform 254 is preferably constructed of heavy gauge metal, and is sized to allow a pair of workmen to comfortably stand and work therefrom. The platform 254 includes a pair of arms 272, one of which is illustrated in FIG. 11. Each arm 272 extends past the rear of the platform 254 and then upward at an angle therefrom. A pair of sleeves 273, again with only one illustrated in FIG. 11, are positioned within the trailer 10. A jack rod securing bracket 274 is provided for holding the jack rod 251 in position during raising and lowering operations.

VIII. Article Latching Assembly

Referring to FIGS. 10, 17 and 18, an article latching assembly 291 is illustrated. The assembly 291 includes an elongate rod 292 which is pivotably attached at one end to a handle 293. The handle 293 is, in turn, pivotable attached to the underneath side of one cross member 78 of each article space 99 at a pivot point 294. The rod 292 includes an eyelet 295 at the other end which is inserted through a corresponding eyelet 296 in one end of a curved rod 301. The curved rod 301 extends through a bore 302 in a bracket 303 mounted atop the cross member 78. A resilient clamping member 304 is attached to the other end of the curved rod 301 and extends transversely thereto. The latching assembly 291 is designed to latch an article, such as the pickup truck cover 22 in position within the rack 10 when the handle 293 is pulled backward but to allow a workman stationed outside the trailer 12 to remotely release the cover 22 by pushing forward on the handle 293.

IX. Operation of Trailer

Although the trailer 12 has many conceivable uses, an exemplary use is for transporting pickup truck covers 22. The pickup truck covers 22 can be loaded by opening the overhead door assemblies 142 whereby the doors 144 are placed in their retracted positions, which opens the openings 83, 140. Cover front ends 24 can be placed on respective, opposed pairs of rail members 86. By pushing on the cover back ends 26, the covers 22 can be inserted into the trailer 12.

The retainer brackets 102 can be held in their release positions (FIG. 7) during insertion of the covers 22; alternatively, the retainer brackets 102 can be spring-biased to their lock positions and can be pushed over by the front ends 24 of covers 22 being inserted. When the cover front ends 24 pass the retainer brackets 102, the retainer brackets 102 either spring or are actuated (e.g. by the retainer actuating mechanisms 111) to their respective locked positions (FIG. 6) whereupon the retainer bracket upper flanges 104 engage the cover front end lower edge flanges 36 (FIG. 6). The retainer hinges 110 have pivotal axes below the level of the second rail mounting members 94 whereby the retainer bracket webs 108 engage the second rail mounting members 94, which act as stops against further rotation of the retainer brackets 102 from their lock positions until they are actuated by the retainer actuating mechanisms 111.

As an alternative to the retaining mechanisms 100, various other retaining means could be provided for securing the covers 22 in their respective article-receiving spaces 99, including C-clamps for clamping to the rail members 86. As a further alternative to the retainer mechanism 100, various solenoid-actuated, pneumatic, hydraulic or keyed retainer mechanisms could be provided for security and theft protection.

The covers 22 are slid on and supported by the rail members 86. Each article-receiving space 99 is adapted to receive a respective cover 22, although smaller covers can be placed under larger covers for transporting multiple covers in a nested configuration in a single article-receiving space. Covers 22 with configurations as shown (i.e., rearward and downward sloping back ends 26) are preferably placed in the article-receiving spaces with their front ends 24 inserted first for positioning adjacent to the frame structure second side 62. The downward-an-drearward sloping cover back ends 26 are thus positioned substantially parallel to and in proximity to the frame structure first side 60 for maximum space utilization. A cover 22 with an overall length greater than the trailer 12 overall width can thus be placed within the enclosure system 20 due to the sloping position of the covers 22. The slope of the rail member 86, which determines the slope of the covers 22, can vary to accommodate particular dimensional requirements of articles to be placed on the trailer 10; fifteen degrees from the horizontal can be advantageously employed for certain covers 22.

With the covers 22 in place, the doors 144 are extended to their closed positions, and their distal ends 150 are attached or locked to the chassis. The trailer 12 is thus secured for transport with the covers 22 comprising its load substantially enclosed and securely retained on the trailer 10.

Upon reaching a destination, the doors 144 are retracted on the take-up reel mechanism 146 and the retainer mechanisms 100 are actuated to place the retainer brackets 102 in their release positions, e.g. by pushing inwardly and upwardly on the covers 22 and pulling the release handles 118 to swing the retainer brackets 102 downwardly (counterclockwise in FIGS. 6 and 7) so that the cover lower edge flanges 36 clear the retainer bracket upper flanges 104 whereby the covers 22 can slide along the rail members 86 and out of the trailer 12.

The sloping position of the loaded covers 22, in addition to minimizing overall trailer width, provides an important advantage in the loading and unloading process, especially for the upper article-receiving spaces 99. The loading operation can be initiated and the unloading operation can be finalized with the cover front ends 24 resting on the rail member first or lower ends and the cover back ends 26 at substantially lower levels. The covers 22 can thus be loaded by sliding them upwardly and can be unloaded by sliding them downwardly, which can be considerably more convenient for workers manually loading and unloading the trailer 12 than trailer systems where the articles, especially relatively long articles such as the covers 22, must be loaded and unloaded horizontally.

IX. Operation of The Article Unloading System

Once the trailer 12 has reached a final destination and the articles, such as pickup truck covers 22, are to be unloaded, the covers 22 in the upper spaces 99 are difficult or impossible for workmen to reach from the ground. Thus, referring to FIGS. 9, 10 and 8, in that order, the unloading system 201 is attached to the rack 10 from which a cover 22 is to be unloaded from a top space 99, as described below.

The ramps 202 and 203 are first pivotably attached to bolts (not shown) in the rack 10 just below the topmost space 99. The cross member 223 is then slid over the bolts 217 in each ramp 202 and 203 and locked in place via the cotter pins 222. The workman's platform 254 is then slid into place in the channels 273 and the jack assembly 233 is connected between the platform 254 and the cross member 223. The system 201 is then ready for the top cover 22 to be unloaded, as shown in FIG. 9.

The jack handle 253 is then rotated in a direction to cause the cross member 223 and thus the ramps 202 and 203 to pivot upward to the upper position, as illustrated in solid lines in FIG. 10. One, or preferably, two workmen then get onto the platform 254 and pull the cover 22 out onto the ramps 202 and 203, to the position as shown in FIG. 10. The pivoting arms 204 are then raised to engage the rear wall 214 of the cover 22 and held in place via the latch 206, and the workmen return to the ground.

The ramps 202 and 203 are then lowered via the jack handle 253 through the arc shown in phantom lines in FIG. 10, to a lowered, unloading position as illustrated in FIG. 8. When the workmen are in place on either side of the cover 22, the pivoting arms 204 are then remotely released via the rods 205, and the cover 22 is slid off of the ramps 202 and 203 to be easily transported by hand to a final destination.

If the trailer 10 and rack 12 is equipped with the remotely operated clamping system 291, the clamp 304 would be remotely released by the workmen via the handle 293 while they are standing on the platform 254 prior to sliding the cover 22 onto the ramps 202 and 203.

Once the topmost cover 22 has been unloaded from the first bay 70, the ramps 202 and 203, cross member 223 and jack assembly 233 can remain assembled while the unloading system 201 is moved from one bay 70 to the next. The jack assembly 233 needs merely to be released from the platform 254 and the platform 254 can be moved independently to the next bay 70 as well.

It is to be understood that while certain forms of the present invention have been illustrated and described herein, it is not to be limited to the specific forms or arrangement of parts described and shown.

What is claimed and desired to be secured by Letters Patent is as follows:

1. A trailer, which comprises:
   (a) a frame structure including
      (i) a top, a bottom, a front, a back, a first side, and a second side;
      (ii) a plurality of columns arranged in pairs of first and second columns with the first column in each pair being adjacent said frame structure first side and the second column in each pair being adjacent said frame structure second side, said pairs of columns dividing said trailer into a plurality of juxtaposed, transverse bays; and
   (b) a rail system comprising a plurality of rails, each said rail having a first, lower end located in proximity to said frame structure first side and a second, upper end located in proximity to said second side, each said rail sloping upwardly from its first end to its second end, said rails being stacked and arranged in opposing pairs within respective ones of said bays to thereby divide each said bay into multiple, transverse, continuously sloped article receiving spaces, said article receiving spaced being sized to accomodate pick-up covers.

2. A trailer as in claim 1, wherein said article receiving spaces are sloped approximately 15 degrees from horizontal.

3. A trailer as in claim 1, and further comprising a cover mounted on said frame structure in covering relation thereover and including a cover opening at said frame structure first side.

4. The invention of claim 3 wherein said cover includes door means adapted to selectively cover said cover opening.

5. The invention of claim 4 wherein said door means comprises:

(a) a flexible door with proximate and distal ends and open and closed positions;

(b) a roll-up mechanism connected to said door proximate end and rolling said door thereon with said door in its open position, said roll-up mechanism being mounted on said frame structure adjacent to the top thereof; and (c) latch means mounted on said door distal end and adapted for selectively latching said door distal end to said frame structure adjacent to the bottom thereof with said door in its closed position.

6. A trailer with a chassis and a plurality of supporting wheels, which includes:

(a) a frame structure having:
   (1) a top;
   (2) a bottom;
   (3) a front;
   (4) a back;
   (5) a first side;
   (6) a second side;
   (7) a plurality of transversely-spaced pairs of columns, each said pair including a front column and a back column, each column being connected to said chassis adjacent to one of said frame structure sides, said column pairs being longitudinally spaced on said chassis whereby a plurality of juxtaposed, transverse bays are formed between adjacent pairs of columns;
   (8) a plurality of cross members extending transversely between respective columns in each said column pair, each said column pair having a plurality of parallel, vertically-spaced cross members extending therebetween;

(b) a plurality of rail subassemblies each including:
   (1) a transverse rail member with a first, lower end positioned in proximity to said frame structure first side and a second, upper end positioned in proximity to said frame structure second side, each said transverse rail member extending in parallel, spaced relation to a respective cross member;
   (2) a first, lower mounting arm having a proximate end connected to a respective cross member and a distal end connected to a respective transverse rail member in proximity to said transverse rail member first, lower end; and
   (3) a second, upper mounting arm having a proximate end connected to a respective frame structure cross member and a distal end connected to a respective transverse rail member in proximity to its second, upper end; whereby (c) said rail subassemblies form a plurality of continuously sloped, article-receiving spaces vertically stacked in each said bay, said article receiving spaces being sized to accommodate pick-up covers.

7. A trailer as in claim 6, wherein said article receiving spaces are sloped approximately 15 degrees from horizontal.

8. A trailer as in claim 6, and further comprising a cover mounted on said frame structure in covering relation thereover.

9. The invention of claim 8 wherein said cover includes door means adapted to selectively cover said frame structure first side.

10. The invention of claim 9 wherein said door means comprises:

(a) a flexible door with proximate and distal ends and open and closed positions;

(b) a roll-up mechanism connected to said door proximate end for selectively rolling said door thereon to place said door in said open position and unrolling said door therefrom to place said door in said closed position, said roll-up mechanism being mounted on said frame structure adjacent to the top thereof; and (c) latch means mounted on said door distal end and adapted for selectively latching said door distal end to said frame structure adjacent to the bottom thereof with said door in said closed position.

11. A vehicle for transporting articles, said vehicle including a frame structure with a loading side and an opposite side, said frame structure including:

(a) a plurality of juxtaposed, transverse bays; and (b) a plurality of vertically stacked, article receiving spaces positioned within each said bay, each said article receiving space being sloped continuously upward from said loading side to said opposite side whereby articles can be legally hauled which, if laid flat, would cause said vehicle to exceed a maximum highway width.

12. A vehicle as in claim 11, wherein said article receiving spaces are sized to accommodate pick-up covers.

13. A trailer as in claim 11, wherein said article receiving spaces are sloped approximately 15 degrees from horizontal.

14. A vehicle as in claim 11, and said frame structure further comprising:

(a) a plurality of vertical columns arranged in pairs of first and second vertical columns with the first columns in each pair being adjacent said vehicle loading side and the second vertical columns in each pair being adjacent said vehicle opposite side, said pairs of vertical columns dividing said vehicle into said plurality of juxtaposed, transverse bays; and (b) a rail system comprising a plurality of rails, each said rail having a first, lower end located in proximity to said vehicle loading side opening and a second, upper end located in proximity to said vehicle opposite side, each said rail sloping upwardly from its first end to its second end, said rails being arranged in opposing pairs within respective ones of said bays to thereby divide each said bay into said vertically stacked plurality of transverse, article receiving spaces.

15. A vehicle as in claim 11, and further comprising:

(a) a cover mounted on said vehicle in covering relation thereover.

16. The invention of claim 15 wherein said cover includes door means adapted to selectively cover said frame structure loading side.

17. The invention of claim 16 wherein said door means comprises:

(a) a flexible door with proximate and distal ends and open and closed positions;

(b) a roll-up mechanism connected to said door proximate end for selectively rolling said door thereon to place said door in said open position and unrolling said door therefrom to place said door in said closed position, said roll-up mechanism being mounted on said vehicle; and (c) latch means mounted on said door distal end and adapted for selectively latching said door distal end to said vehicle with said door in said closed position.

* * * * *